(12) United States Patent
Hsu et al.

(10) Patent No.: US 7,310,205 B2
(45) Date of Patent: Dec. 18, 2007

(54) THERMALLY ASSISTED RECORDING OF MAGNETIC MEDIA USING A RESONANT CAVITY AND ENERGY

(75) Inventors: Yimin Hsu, Sunnyvale, CA (US); Chie Ching Poon, San Jose, CA (US); Timothy Carl Strand, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 448 days.

(21) Appl. No.: 10/955,691

(22) Filed: Sep. 30, 2004

(65) Prior Publication Data

US 2006/0067001 A1 Mar. 30, 2006

(51) Int. Cl.
*G11B 5/127* (2006.01)
(52) U.S. Cl. .................................. 360/317
(58) Field of Classification Search .............. 360/317, 360/59, 243.3; 369/13.05, 13.32, 124.01, 369/13.33, 13.24, 13.25
See application file for complete search history.

(56) References Cited

U.S. PATENT DOCUMENTS

| 7,042,810 | B2* | 5/2006 | Akiyama et al. | 369/13.33 |
| 2003/0128452 | A1* | 7/2003 | McDaniel et al. | 360/59 |
| 2003/0184903 | A1 | 10/2003 | Challener | 360/59 |
| 2003/0193117 | A1* | 10/2003 | Schreiner et al. | 264/400 |
| 2004/0001420 | A1 | 1/2004 | Challener | 369/112.27 |
| 2004/0008591 | A1 | 1/2004 | Johns et al. | 369/13.14 |
| 2004/0062152 | A1* | 4/2004 | Stancil et al. | 369/13.05 |
| 2004/0062503 | A1 | 4/2004 | Challener | 385/129 |
| 2006/0067001 | A1* | 3/2006 | Hsu et al. | 360/234.3 |
| 2006/0164960 | A1* | 7/2006 | Poon et al. | 369/124.01 |
| 2006/0233061 | A1* | 10/2006 | Rausch et al. | 369/13.32 |

OTHER PUBLICATIONS

Journal of Modern Optics, 2003, vol. 50, No. 15-17, 2543-2550, "Nanofabrication of optical structures and devices for photonics and biophotonics".
"Losses in single-mode silicon-on-insulator strip waveguides and bends", by Yurii A. Vlasov and Sharee J. McNab, IBM T.J. Watson Research Center, Apr. 19, 2004, vol. 12, No. 8, Optics Express 1622.

(Continued)

*Primary Examiner*—Tianjie Chen
(74) *Attorney, Agent, or Firm*—Robert O. Guillot; Intellectual Property Law Offices

(57) ABSTRACT

A magnetic head including a media heating device including an optical cavity resonator that produces a high intensity near-field optical beam adjacent to the write pole. Optical energy is coupled into the resonant cavity through a waveguide that is placed proximate the cavity, and optical energy is coupled out of the cavity through an aperture that is placed proximate an antinode or post within the cavity. The write pole tip may serve as the post in certain embodiments. The media heating device is preferably fabricated between the first and second magnetic pole layers of a perpendicular magnetic head and close to the ABS surface of the head. An alternative embodiment may include a near field aperture disposed between the resonant cavity and the ABS.

45 Claims, 8 Drawing Sheets

OTHER PUBLICATIONS

"High quality-factor whispering-gallery mode in the photonic crystal hexagonal disk cavity", by Han-Youl Ryu and Masaya Notomi, NTT Basic Research Laboratories, Apr. 19, 2004, vol. 12, No. 8, Optics Express 1708.

Journal of Lightwave Technology, vol. 22, No. 3, Mar. 2004, "Optical Spolsize Converter Using Narrow Laterally Tapered Waveguide for Planar Lightwave Circuits", by Takayuki Mizuno et al.

"A Type of Electrical Resonator", by W.W. Hansen, Jul. 17, 1937, Journal of Applied Physics.

Spectrochimica Acta, vol. 31B, pp. 483 to 486, "A cavity for microwave-induced plasmas operated in helium and argon at atmospheric pressure", Jun. 1976.

"Klystrons and Microwave Triodes", by Donald R. Hamilton, et al., 1964.

"Fields and Waves in Communication Electronics", Second Editon, no date.

"Coupled re-entrant cavity system for electromagnetic levitation" by A.J. Sangster et al., Jul. 1999.

Nature, vol. 424, Aug. 14, 2003, "Optical Microcavities" by Kerry J. Vahala.

"Mode field patterns and preferential mode coupling in planar waveguide-coupled square microcavities" by Chung Yan Fong and Andrew W. Poon, Nov. 3, 2003, vol. 11, No. 22, Optics Express 2897.

"SiON high-refractive-index waveguide and planar lightwave circuits", by G.L. Bona et al., IBM J. Res. & Dev., vol. 47, No. 2/3, Mar./May 2003.

"Antiresonant reflecting optical waveguides in $SiO_2$-Si multilayer structures", by M.A. Duguay et al., Appl. Phys Lett. 49(1), Jul. 7, 1986.

"Reference Data for Engineers: Radio, Electronics, Computer,and Communications", by Mac E. Van Valkenburg et al., Newnes, 2001.

Optics Letters, vol. 28, No. 15, Aug. 1, 2003, "Ultrahigh light transmission through a C-shaped nanoperture", by Xiolei Shi et al.

"Resonan:-enhanced evanescent-wave fluorescence biosensing with cylindrical optical cavities", by Steve Blair and Yan Chen, Applied Optics, vol. 40, No. 4, Feb. 1, 2001.

Journal of Lightwave Technology, vol. 15, No. 11, Nov. 1997, "FDTD Microcavity Simulations: Design and Experimental Realization of Waveguide-Coupled Single-Mode Ring and Whispering-Gallery-Mode Disk Resonators", S.C. Hagness et al.

Robert G. Hunsperger, Integrated Optics: Theory and Technology, no date.

Physical Review Letters, vol. 91, No. 4, Jul. 25, 2003, "Ideality in a Fiber-Taper-Coupled Microresonant System for Application to Cavity quantum Electrodynamics" by S.M. Spillane et al.

* cited by examiner

THERMALLY ASSISTED RECORDING OF MAGNETIC MEDIA USING A RESONANT CAVITY AND ENERGY

BACKGROUND OF THE INVENTION

1. Field of the Invention

The present invention relates generally to magnetic heads that are utilized with thin film hard disk data storage devices, and more particularly to the design and fabrication of a magnetic head having an optical energy resonant cavity storage media heating device formed therein.

2. Description of the Prior Art

Hard disk drives generally include one or more rotatable data storage disks having a magnetic data storage layer formed thereon. Data in the form of small magnetized areas, termed magnetic data bits, are written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

The continual quest for higher data recording densities of the magnetic media demands smaller magnetic data bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include the use of higher magnetic moment materials, and using thermally assisted recording heads. The present invention relates to such thermally assisted recording heads in which a heating device is disposed within the magnetic head. Heat from the heating device temporarily reduces the localized coercivity of the magnetic media, such that the magnetic head is able to record data bits within the media. Once the disk returns to ambient temperature, the very high coercivity of the magnetic media provides the bit stability necessary for the recorded data disk.

Thermally assisted recording (TAR) is potentially a powerful technique in advancing magnetic recording to the 1 Tbit/in$^2$ range and beyond, and a promising technique includes the use of optical energy from the magnetic head to heat the media as it passes beneath the head. However, in using optical energy for the heating of the magnetic medium, one needs to consider the applicability of the optics in near field, e.g., 1 to 20 nm from the source which resides in the magnetic head slider, and the heating of an area in the medium of very small dimensions, e.g., in the 20 to 30 nm range. Conventional diffraction limited optics is not applicable for such a small area. Recently, descriptions of several TAR methods for near-field heating of media have been published. In published U.S. patent applications US2003/0184903 A1 and US2004/0008591 A1 special ridged waveguides used as high transmission apertures disposed within the magnetic head are taught for applications in perpendicular recording. In one example, a ridged waveguide is located immediately downtrack of the write pole such that the input plane of the ridged waveguide is parallel to the air bearing surface (ABS). In published U.S. patent applications US2004/0001420 A1 and US2004/0062503 A1 a planar waveguide is constructed on the downtrack side of the write pole. In this respect the heated spot is displaced downtrack of the write pole by the thickness of a cladding of the waveguide. In general the size of the heated spot depends on the optical wavelength and the dimensions and the composition of the materials for the waveguide/ridged waveguide.

In order to understand the operation of an optical cavity resonator it is useful to first consider the resonance of a simple circular cylindrical cavity at microwave frequencies, i.e., the cavity is a hollow circular cylinder. In microwave electronics, a closed circular cylinder has well defined resonances represented by transverse magnetic $TM_{mnp}$ modes and transverse electric $TE_{mnp}$ modes. The indices m, n, and p refer to the number of modes in the azimuthal, radial and longitudinal directions, respectively. For the present case, we limit our discussions to the fundamental mode, $TM_{010}$ i.e., there are no variations in the azimuthal and longitudinal directions. In this simple mode the magnetic field for $TM_{010}$ is concentric with the cylinder. On the other hand, the electric field is in the axial direction and has a maximum in the center of the cylinder. All its electric field lines span between the two side walls.

In an effort to increase the electric field in a circular cylindrical cavity, the reentrant cylindrical cavity resonator 12 shown in FIGS. 1A and 1B was developed for the generation of microwave power with klystrons and magnetrons. This cavity 12 is simply a circular cylindrical cavity with a coaxial post 16 which is shorter than the thickness of the cavity. The post extends from one side wall 20 and ends at a subwavelength distance, d, from the opposite side wall 24. An aperture 28, usually of subwavelength diameter, is placed in the side wall 24 opposite to the end of the post 16. The presence of the post 16 compounds the designation of the resonant modes. However, the cavity 12 is normally operated to resonate in a fundamental mode such that the electric and magnetic fields are axisymetric. Further, the electric field at the post remains parallel to the axis and peaks at or near the axis. Also, the magnetic field is perpendicular to the electric field such that its field lines are concentric circles about the axis. The presence of the post 16 intensifies the electric field at the axis because the post to side wall separation, d, is now smaller than the thickness of the cylinder. Generally, the smaller the magnitude of d, the greater the axial electric field strength along the axis. What these experiments in the microwave regime have demonstrated is that a reentrant cylindrical cavity of subwavelength dimensions can produce very high intensity electric field in a direction normal to the face 24 of the cavity, a fact that is extended in the present invention for near field thermal heating at optical wavelengths.

Since any modification to a resonant cavity, such as a post or an aperture, perturbs the simple TE and TM modes in the cavity, in the following we will refer to axial modes where the fields in the original, unmodified resonant cavity would be TM and will use in-plane to refer to fields which would have been TE in the unmodified resonant cavity. Thus for a circular cylindrical cavity, axial fields will imply that the electric field is predominantly oriented parallel to the axis of the cylinder and in-plane fields will imply that the electric field is predominantly perpendicular to the axis of the cylinder and thus in the plane of the air bearing surface.

An important consideration in using an optical resonant cavity for near-field heating is in coupling the optical power into the resonant cavity 12. A known technique in optical communication in coupling power into a cylindrical optical cavity is by way of evanescent-wave coupling from an integrated waveguide. As an example of this, R. W. Boyd et al., in Journal of Modern Optics, 2003, Vol. 50, No. 15-17, 2543-2550, "Nanofabrication of optical structures and devices for photonics and biophotonics" teaches a system consisting of a waveguide coupled to a resonant whispering gallery mode (WGM) cavity. The technique is schematically represented in FIGS. 2A and 2B where a tapered planar waveguide 40 is placed near a circular disk microcavity 44. The coupling can be effected if the waveguide 40 is placed with a gap 48 that is a fraction of a wavelength from the cavity. In this device the cavity and waveguide are comprised of a relatively high index of refraction material 50 such as GaAs that is surrounded by a relatively low index of refraction material, in this case air. The upper and lower surfaces of the waveguide and cavity are likewise bordered by layers 52 of relatively low index of refraction material, such as $Al_xGa_{1-x}As$, where x equals 0.4.

Much of the difficulty in applying near field optical devices for TAR lies in their incompatibility with the space-limited mechanical structure of the write poles within a magnetic head, the difficulty in bringing photons to such devices, and meeting the requirements for producing a near field high intensity optical beam that is within about 10 nm from the bit area that is being written. The heated spot is preferably at or a short distance uptrack of the write pole.

SUMMARY OF THE INVENTION

An embodiment of a magnetic head of the present invention includes a media heating device that is fabricated within the magnetic head structure. The media heating device is preferably fabricated between the first and second magnetic pole layers of a perpendicular magnetic head and close to the ABS surface of the head, where it serves to heat the magnetic media during or immediately prior to the passage of the magnetic media beneath the write gap of the magnetic head. The heating of the media lowers its localized coercivity, which facilitates the writing of data to the media by the write head element of the magnetic head.

A magnetic head of the present invention includes an optical cavity resonator that can produce a high intensity near-field optical beam of subwavelength dimension adjacent to the write pole that is appropriate for perpendicular recording at 1 Tbits/in$^2$ and beyond. Optical energy is coupled into the resonant cavity through a waveguide that is placed proximate the cavity, and optical energy is coupled out of the cavity through an aperture that is placed proximate an antinode or post within the cavity. The write pole tip may serve as the post in certain embodiments. An alternative embodiment may include a near field aperture disposed between the resonant cavity and the ABS.

It is an advantage of the magnetic head of the present invention that it includes an improved media heating element to facilitate the writing of data to a magnetic disk.

It is another advantage of the magnetic head of the present invention that it includes an improved heating element that is disposed such that the media is heated by the heating element prior to its passage below the write pole of the magnetic head.

It is a further advantage of the magnetic head of the present invention that it includes a heating element that can be disposed coaxial with the write pole on the magnetic head.

It is yet another advantage of the magnetic head of the present invention that it provides high efficiency coupling of light from a source into the media by means of a resonant cavity and specially designed coupling mechanism.

It is yet a further advantage of the magnetic head of the present invention that it provides a heated spot that is scalable as bit density increases beyond 1 Tbits/in$^2$.

It is an advantage of the hard disk drive of the present invention that it includes a magnetic head having an improved media heating element, whereby higher data areal storage densities of the hard disk drive can be obtained.

It is another advantage of the hard disk drive of the present invention that it includes a magnetic head having an improved media heating element, whereby data storage disks having a higher coercivity can be written upon.

It is a further advantage of the hard disk drive of the present invention that it includes a magnetic head that includes an improved media heating element to facilitate the writing of data to a magnetic disk.

It is yet another advantage of the hard disk drive of the present invention that it includes a magnetic head having an improved heating element that is disposed such that the media is heated by the heating element prior to its passage beneath the write pole of the magnetic head.

It is a further advantage of the hard disk drive of the present invention that it includes a magnetic head having a heating element that it provides high efficiency coupling of light from a source into the media by means of a resonant cavity and specially designed coupling mechanism.

It is a further advantage of the hard disk drive of the present invention that it includes a magnetic head having a heating element that provides a heated spot that is scalable as bit density increases beyond 1 Tbits/in$^2$.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIGS. 1A and 1B depict a microwave circular cylindrical reentrant cavity resonator of the prior art, wherein FIG. 1A is a top plan view and FIG. 1B is a side cross-sectional view taken along lines B-B of FIG. 1A;

FIGS. 2A and 2B depict a prior art system for coupling light from a source through a waveguide to a resonant cavity, wherein FIG. 2A is a top plan view and FIG. 2B is a side elevational view taken along lines B-B of FIG. 2A;

FIGS. 5A, 5B and 5C depict a first embodiment of a magnetic head of the present invention that includes an optical resonant cavity media heating device, wherein FIG. 5A is a cross-sectional view, FIG. 5B is a plan view taken from the ABS, and FIG. 5C is a plan view from the downtrack side;

FIGS. 6A, 6B and 6C depict another embodiment of a magnetic head of the present invention that includes an optical resonant cavity media heating device, wherein FIG. 6A is a cross-sectional view, FIG. 6B is a plan view taken from the ABS, and FIG. 6C is a plan view from the downtrack side;

Figure 7A:
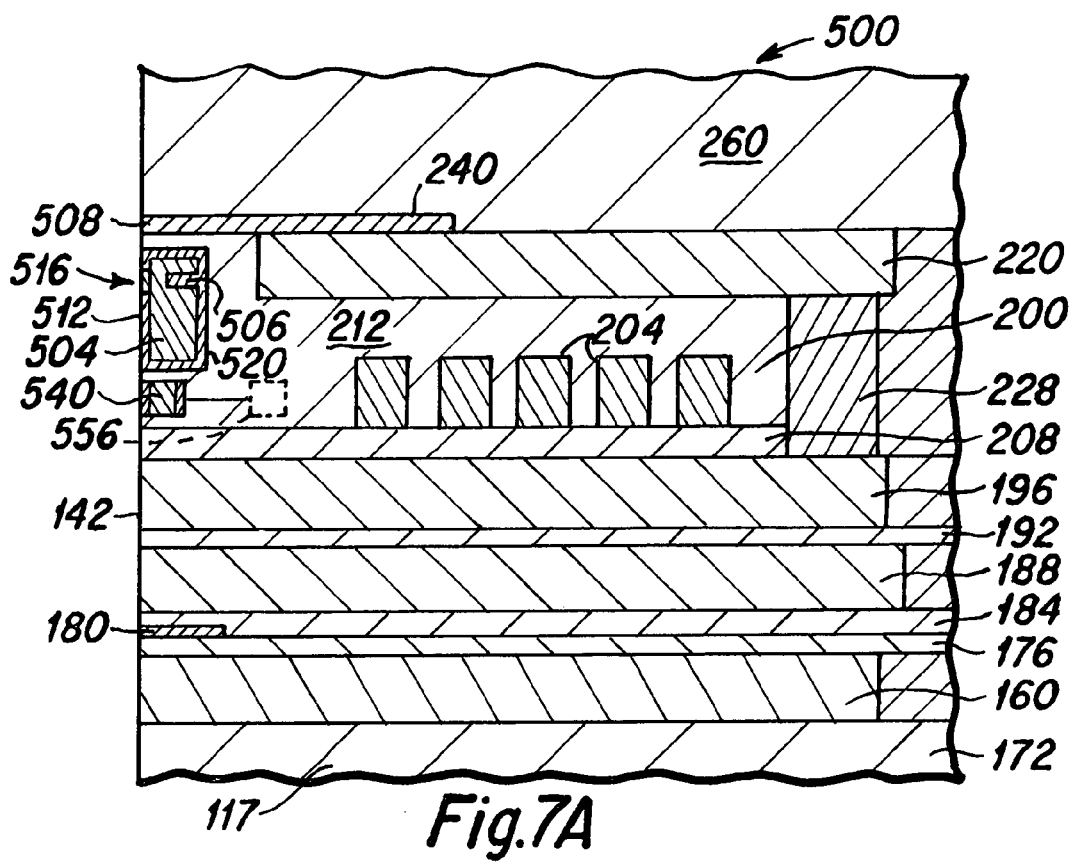
Figure 7B:
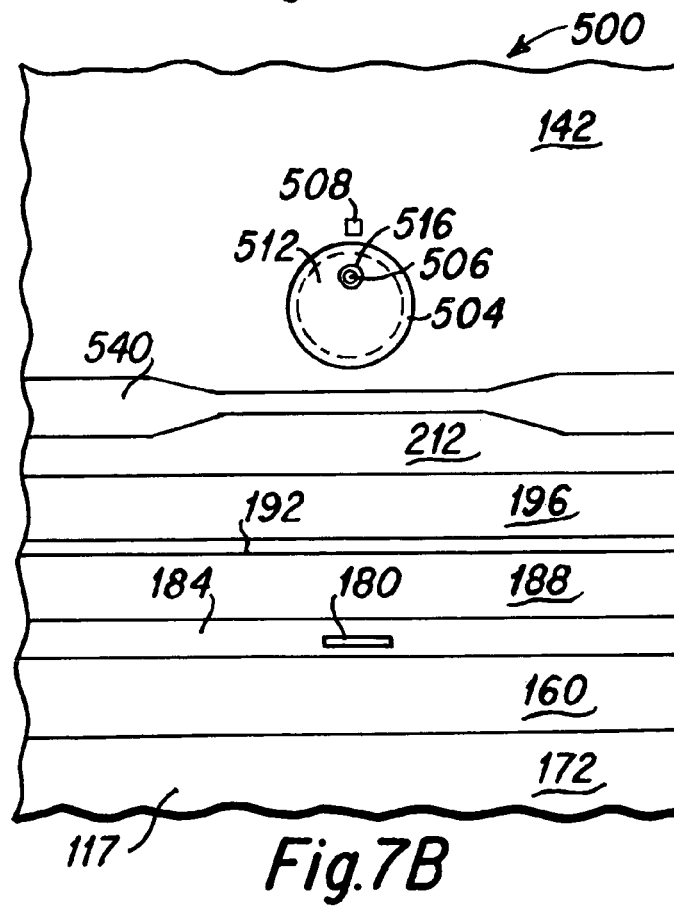
Figure 8A:
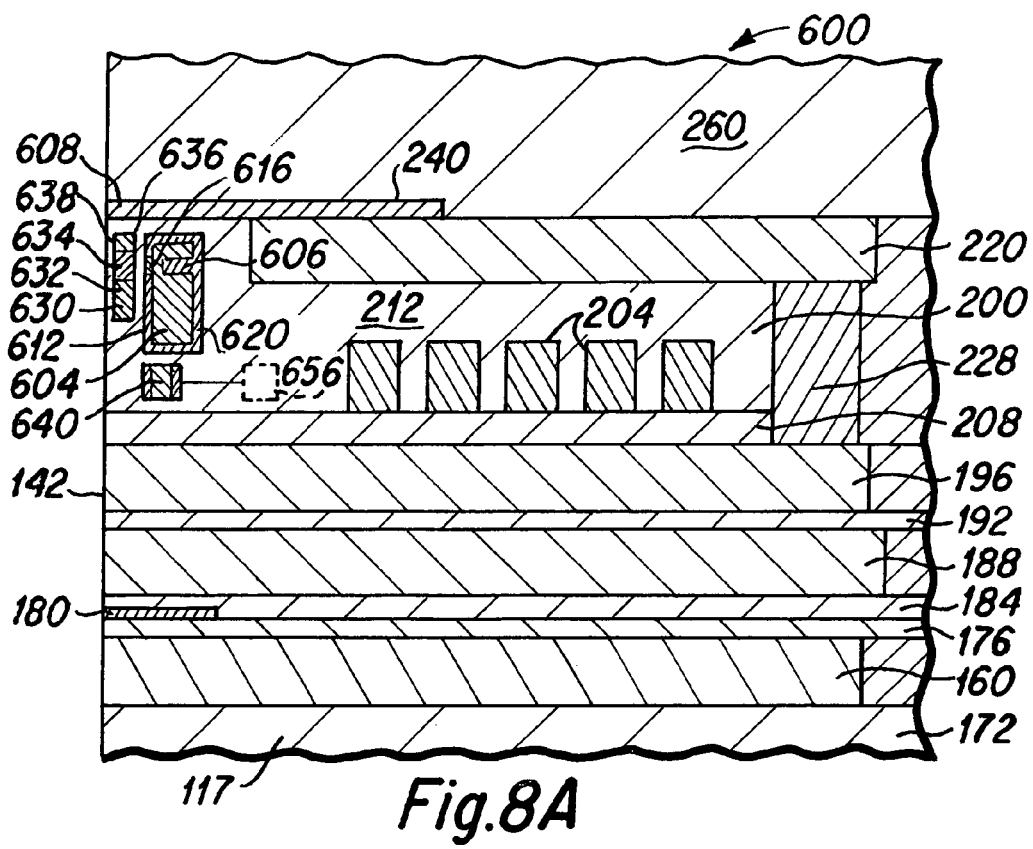
Figure 8B:
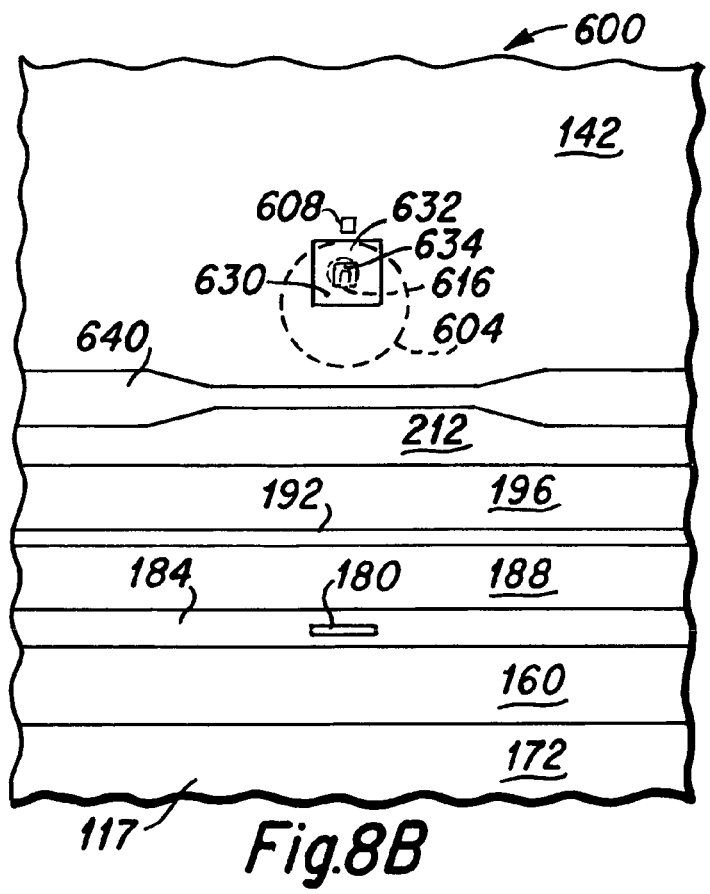
Figure 7C:
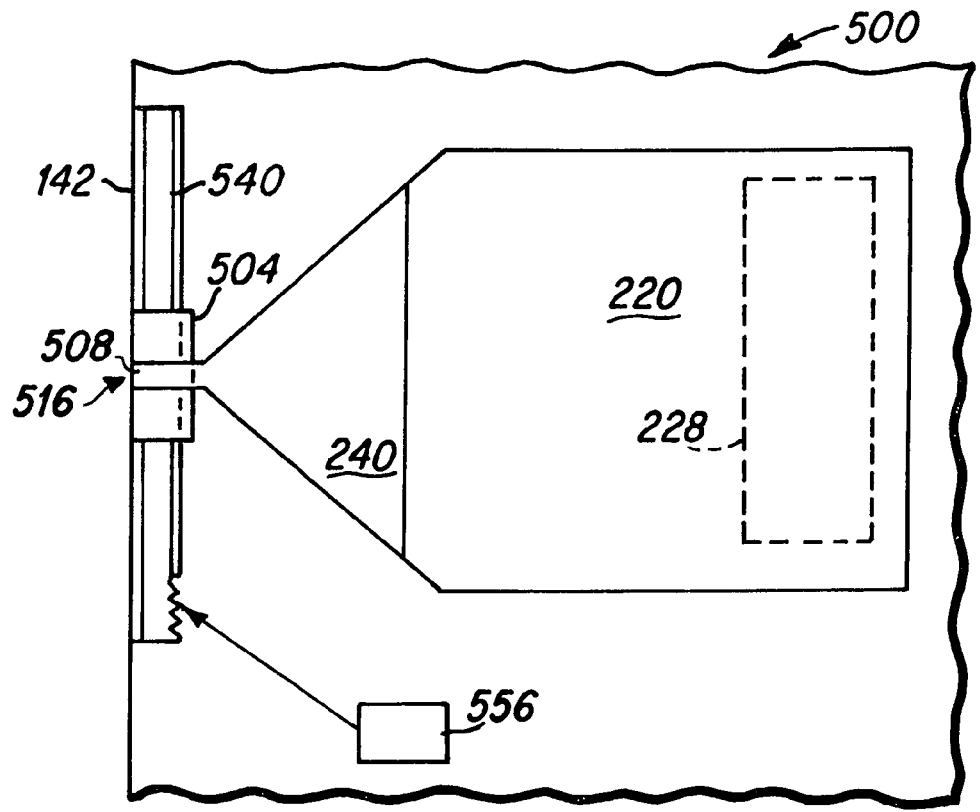
Figure 8C:
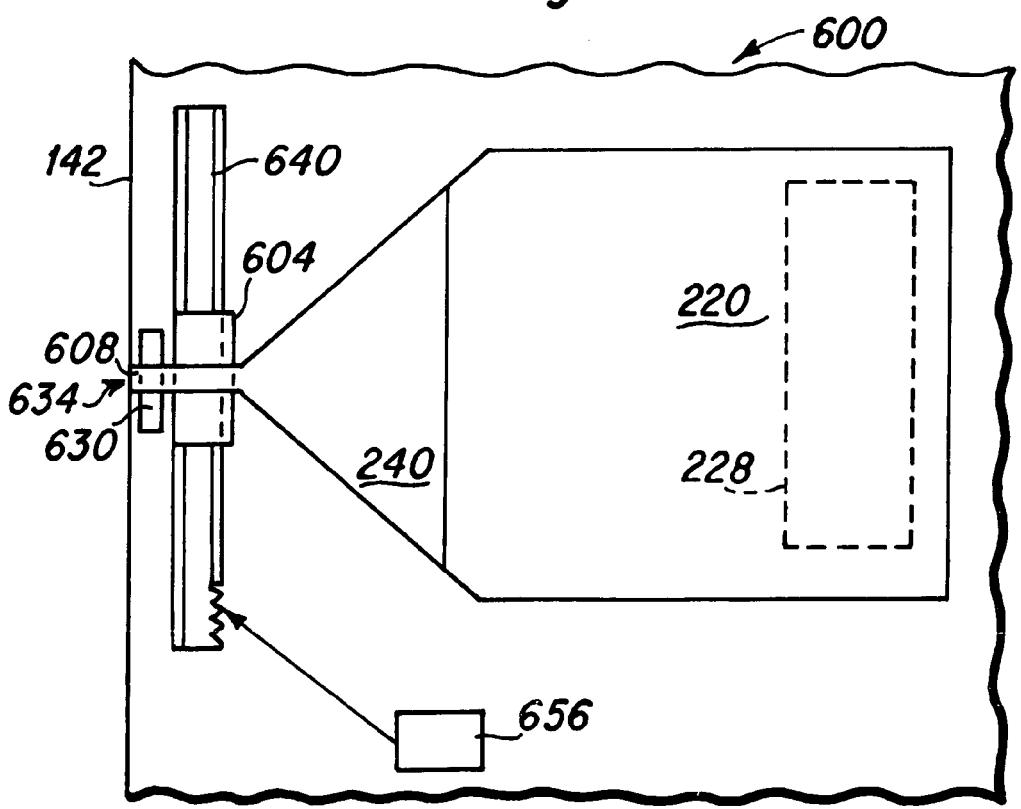

FIGS. 7A, 7B and 7C depict a further embodiment of a magnetic head of the present invention that includes an optical resonant cavity media heating device, wherein FIG. 7A is a cross-sectional view, FIG. 7B is a plan view taken from the ABS, and FIG. 7C is a plan view from the downtrack side; and FIGS. 8A, 8B and 8C depict a further embodiment of a magnetic head of the present invention that includes an optical resonant cavity media heating device and a near field aperture, wherein FIG. 8A is a cross-sectional view, FIG. 8B is a plan view taken from the ABS, and FIG. 8C is a plan view from the downtrack side.

DETAILED DESCRIPTION OF THE PREFERRED EMBODIMENTS

The magnetic head of the present invention is utilized to read and write data to magnetic media, such as a hard disk in a hard disk drive. A simplified top plan view of a hard disk drive 110 is presented in FIG. 3, wherein at least one magnetic media hard disk 112 is rotatably mounted upon a spindle 114. A magnetic head 116 of the present invention is formed upon a slider 117 that is mounted upon an actuator arm 118 to fly above the surface 119 of each rotating hard disk 112, as is well known to those skilled in the art. A typical hard disk drive 110 may include a plurality of disks 112 that are rotatably mounted upon the spindle 114, and a plurality of actuator arms 118, each having at least one slider 117 with a magnetic head 116 that is mounted upon the distal end of the actuator arms 118. As is well known to those skilled in the art, when the hard disk drive 110 is operated, the hard disk 112 rotates upon the spindle 114 and the slider acts as an air bearing in flying above the surface of the rotating disk. The slider 117 includes a substrate base upon which various layers and structures that form the magnetic head are fabricated. Such heads are fabricated in large quantities upon a wafer substrate and subsequently sliced into discrete magnetic heads 116.

Figure 4:
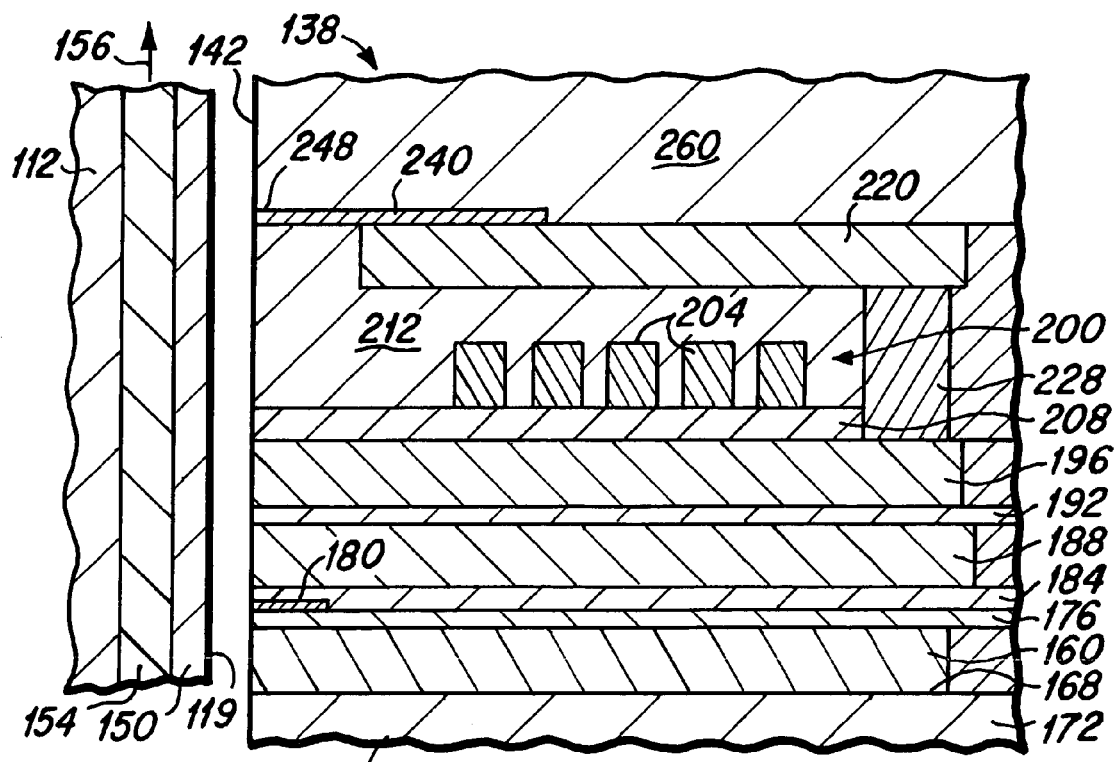
FIG. 4 is a side cross-sectional view depicting various components of a prior art perpendicular magnetic head.

FIG. 4 is a side cross-sectional diagram of a typical prior art perpendicular magnetic head 138 which serves as a basis for the description of an improved perpendicular write head of the present invention which follows. As depicted in FIG. 4, a slider 117 having an air bearing surface (ABS) 142 is shown in a data writing position above the surface 119 of a hard disk 112. The disk 112 includes a high coercivity magnetic layer 150 that is fabricated on top of a magnetically soft underlayer 154. In FIG. 4, the disk 112 is moving towards the top (arrow 156) relative to the stationary slider 117.

The perpendicular head 138 includes a first magnetic shield layer (S1) 160 that is formed upon the upper surface 168 of the slider substrate 172. A first insulation layer (G1) 176 is formed on the S1 shield 160 and a read head sensor element 180 is formed on the G1 layer 176. A second insulation layer (G2) 184 is formed on the sensor 180 and a second magnetic shield layer (S2) 188 is formed upon the G2 insulation layer 184. An electrical insulation layer 192 is then deposited upon the S2 shield 188, and a first magnetic pole (P1) 196 is fabricated upon the insulation layer 192. An induction coil structure 200 is fabricated upon the P1 pole 196, that includes induction coil turns 204 that are typically formed upon an electrical insulation layer 208 and within filling insulation 212. A second magnetic pole layer 220 typically termed a shaping layer or yoke 220, is fabricated on top of the induction coil structure 200. A magnetic back gap piece 228 joins the back portions of the P1 pole 196 and the shaping layer 220, such that magnetic flux can flow between them. A probe layer 240 including a pole tip 248 is next fabricated in magnetic flux communication with the shaping layer 220.

Following the fabrication of the probe layer 240, further magnetic head fabrication steps, such as the fabrication of electrical interconnects (not shown), are accomplished, as are well known to those skilled in the art, and the magnetic head is subsequently encapsulated, such as with the deposition of an alumina layer 260. Thereafter, the wafer is sliced into rows of magnetic heads, and the ABS surface 142 of the heads is carefully polished and lapped and the discrete magnetic heads 138 are ultimately formed.

As is well understood by those skilled in the art, electrical current flowing through the induction coil 204 will cause magnetic flux to flow through the magnetic poles of the head, where the direction of magnetic flux flow depends upon the direction of the electrical current through the induction coil. For instance, current in one direction will cause magnetic flux to flow through the shaping layer 220 through the narrow pole tip 248 into the high coercivity magnetic layer 150 of the hard disk 112. This magnetic flux causes magnetized data bits to be recorded in the high coercivity layer 150 as the disk moves past the magnetic head in direction 156, where the magnetization of the data bits is perpendicular to the surface 119 of the disk 112.

As indicated hereabove, to increase the areal data storage density of hard disk drives, the disks are fabricated with high coercivity magnetic media that can form and maintain smaller magnetic data bit cells. To write data to the high coercivity media it is helpful to include a media heating device within the magnetic head, such that the localized heating of the media reduces its coercivity and the magnetic head can then more easily and reliably write data bits into the heated magnetic media layer. Once the disk returns to ambient temperature the high coercivity of the magnetic media provides the bit stability necessary for the recorded data bit. As is described hereinbelow, the present invention includes magnetic heads having improved media heating devices that comprise optical resonant cavity systems for enabling thermally assisted recording for 1 Tbits/in$^2$ and beyond. A general discussion of such optical systems is next presented, followed by a detailed discussion of their implementation in the magnetic head embodiments of the present invention.

The resonant cavity optical system for a magnetic head consists of three separate elements which have to be designed to work together. The main component is a resonant cavity that provides high optical fields to improve coupling efficiencies. A means for bringing light from a laser source into the resonant cavity is also required; this is preferably a waveguide that is tapered and located close to the cavity in a manner to maximize coupling from the waveguide to the cavity. Finally, a means of coupling light from the cavity to the medium in a small, localized area on the order of 25 nm in diameter is needed, and microwave concepts are adapted to optical frequencies and applied to high density magnetic recording.

The goal of this invention is to produce a very strong optical field at or near the write pole of a magnetic recording head using a resonant optical cavity. These cavities are generally circular cylindrical or ring structures, although they may also be rectangular or photonic crystal structures. The ring structure, in particular, can be of an elongated shape to form a racetrack-shaped ring structure. The field inside these cavities can be enhanced over the field used to feed the cavity by a large factor equal to the Q, or quality factor of the cavity. Q values of >1 are commonly quoted and values $10^5$-$10^9$ have been demonstrated in simulations. The large field enhancement in the cavity means larger fields can be delivered to the medium. The cavity is created as a dielectric material that is shaped to the desired cavity dimensions and disposed within the magnetic head, where the dielectric material is non-absorbing at the optical wavelengths used to excite the cavity. For a wavelength in the 1-2 μm range, silicon (Si) can be used as the cavity material. Cavities and waveguides can be integrated on a silicon-on-insulator (SOI) wafer, while other commonly used materials are silica-on-silicon and silicon oxy-nitride (SiON). Gallium arsenide and other III-V materials are also often used when sources (e.g. semiconductor lasers) or other active optical devices are integrated in the same structure, and they may also be incorporated within the present invention.

Light can be confined in the cavity by a number of well-known methods that all produce an interface that reflects the light. The simplest of these methods is an interface with a dielectric material of lower index of refraction as is used in step index optical fibers. Other methods include a reflective metal coating, a reflective dielectric thin film stack, a gradient index interface, an overlay of high index material, an overlay of a reflective grating, an anti-resonant reflective structure or a photonic crystal structure. For the purposes of this invention, dielectric interfaces will generally be the preferred method although metal interfaces may be used on the top and/or bottom faces to help confine the field that is coupled out of the cavity into the recording medium.

The dimensions of the cavity are determined by the wavelength of the light in the material, the confinement method and the cavity mode being used. For $TM_{010}$ mode in a silicon cylindrical cavity surrounded by air at a wavelength (in air) of 1.55 μm, the cavity diameter would be on the order of 340 nm. In order to assure only the lowest order modes are allowed in the axial direction, the cavity thickness should be less than $\lambda_{eff}/2$, where $\lambda_{eff}$ is the wavelength in the cavity. For the Si cavity at 1.55 μm, this means the thickness should be <220 nm. For this invention, higher order modes can also be employed. Whispering gallery modes (WGM), where there are a string of maxima around the periphery of the cylinder, may be used. In this case the cavity can be several microns in diameter.

As is discussed in detail herebelow, the cavity is built into the magnetic head with its axis normal to the air-bearing surface (ABS) and with one face of the cavity either at the ABS or close to it. The cavity face nearest the ABS may have a protective coating on it and may be covered with a lubricant. This invention calls for the cavity to be built either around the write-pole or as close to the write pole as possible on the up-track side of the pole.

Given a resonant cavity, mechanisms are required to bring light into the cavity and then again to couple light out of the cavity and into the recording medium. In practice, these elements all need to be designed in conjunction with the cavity and the recording medium to optimize the overall performance, but they are next discussed separately for simplicity. In general, a semiconductor laser will be used as the light source, and this invention uses a waveguide to bring light from the source to the resonant cavity. Although not necessary, for simplicity the waveguide will in general be similar to the cavity in terms of the materials and film thicknesses used to fabricate it. Light from the laser can be coupled into the waveguide in a number of commonly known ways. If the laser and waveguide are on the same substrate, the laser can be directly butt-coupled into the waveguide with good efficiency. If not, a spot size reducer can be put on the end of the waveguide and the laser can be focused onto it, or a grating or prism coupler can be placed on the waveguide for coupling. When properly designed, all of these methods can have good coupling efficiency.

To couple light from the waveguide to the cavity, the waveguide is generally tapered down and brought into close proximity to the cavity. An example of a waveguide coupled to a resonant cavity with both on the same substrate is presented in R. W. Boyd et al., in Journal of Modern Optics, 2003, Vol. 50, No. 15-17, 2543-2550, "Nanofabrication of optical structures and devices for photonics and biophotonics". When properly designed, this coupling can be close to 100% efficient and the field intensity in the cavity will be larger than the field in the waveguide by a factor of Q.

Finally it is required to couple the light out of the cavity and into the recording medium. This can be done resonantly or non-resonantly. Since the cavity has very high fields internally, any non-resonant aperture or perturbation placed on the cavity will result in good field strength outside the cavity. As an example of this, Boyd et al. teaches placing a small absorbing particle on top of the cavity at the location of a field maximum, whereupon nearly 100% of the light from the waveguide is coupled through the cavity and out at the particle location, resulting in very strong fields at the particle. In the present invention, output coupling at a small localized area can be achieved by making a small diameter hole in the cavity at the location of a field maximum and leaving it open or filling it with a material whose index of refraction is different from that of the cavity material. It is important to realize that this is one area where the design of the output coupling mechanism is tightly bound to the design of the cavity and to the recording medium. Introducing a perturbation will alter the cavity resonance slightly as will the presence of the recording medium in the near field of the cavity. These effects have to be taken into consideration in the design. With proper design, the output coupling can also be done resonantly to maximize the overall coupling to the recording medium. An example of this is the microwave reentrant cavity described above where a metal post is placed in the cavity whose dimensions are chosen to achieve resonance. This greatly enhances the field at the output of the cavity, which in the microwave case is a hole in the cavity located below the post.

A similar technique is employed for the optical cavity of the present invention by depositing a metal post in the resonant cavity at the location of a field maximum, and the post may comprise the write pole tip of the magnetic head, as is discussed in detail herebelow. The post dimensions and shape are designed to achieve a resonance with the field in the cavity producing an intense electric field beneath the post. The lateral extent of the intense field is determined by the post diameter. This post and aperture diameter can be much smaller than the wavelength used. In the microwave reentrant cavity example, the post and aperture diameters were between 0.14λ and 0.11 λ. For the optical case, using λ=1.55 μm and a silicon cavity, this would mean a post diameter of about 64 nm which is in the range for 1 Tbits/in² magnetic recording. This again assumes resonance conditions with axial electric fields.

The resonant cavity approach can also be used for in-plane fields. For axial fields, the preferred cavity is one with a post, as in the reentrant cavity. For in-plane fields either a cylindrical disk or race-track cavity can be used in either low order modes or WGM. These cavities can be used with either a simple aperture or a near-field aperture, where we define a near field aperture as one which has enhanced intensity in the near-field. Examples of this are ridged waveguides. A special type of ridged waveguide, the so-called C aperture, has been described by X. Shi and L. Hesselink in Journal of the Optical Society of America B, 2004, Vol. 21, No. 7, 1305-1317, "Design of a C aperture to achieve λ/10 resolution and resonant transmission". Combining the near-field aperture with the resonant cavity again multiplies its efficiency by providing very high fields behind the near-field aperture. Although the metal post is the preferred embodiment for this invention, any other resonant structure that produces a small localized field can be used. Four embodiments to illustrate the application of resonant cavities for thermally assisted magnetic recording are next discussed.

Figure 1A:
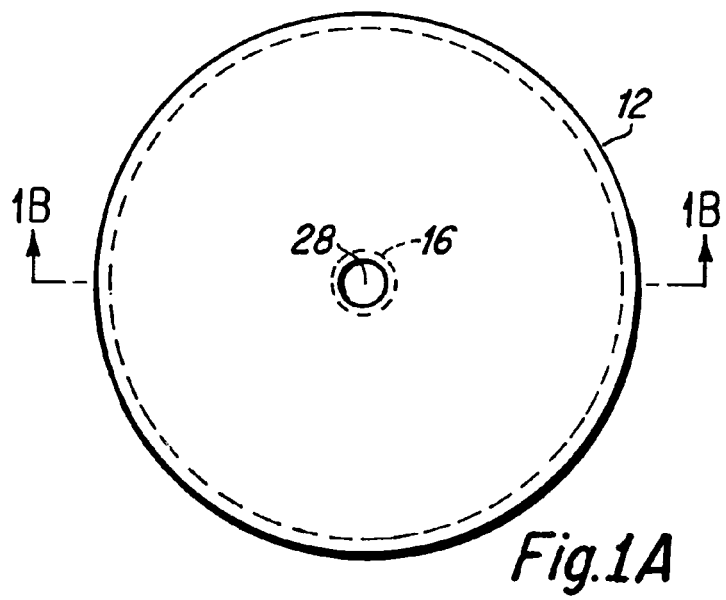
Figure 1B:
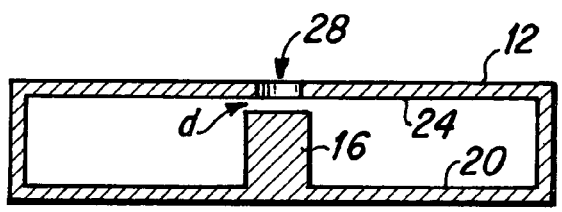
Figure 2A:
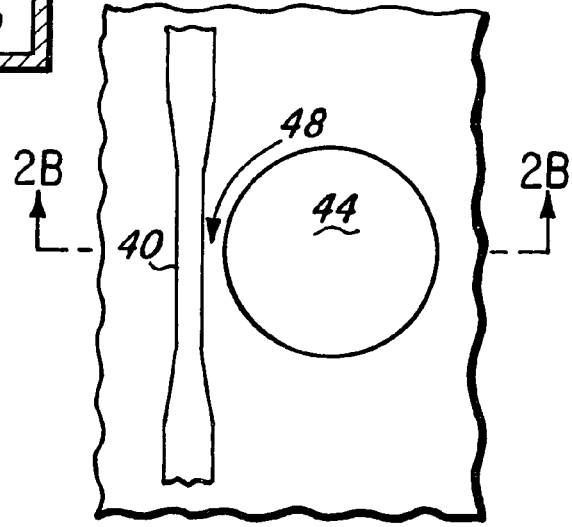
Figure 2B:
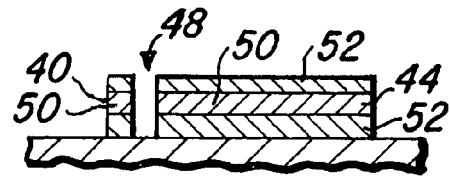
Figure 3:
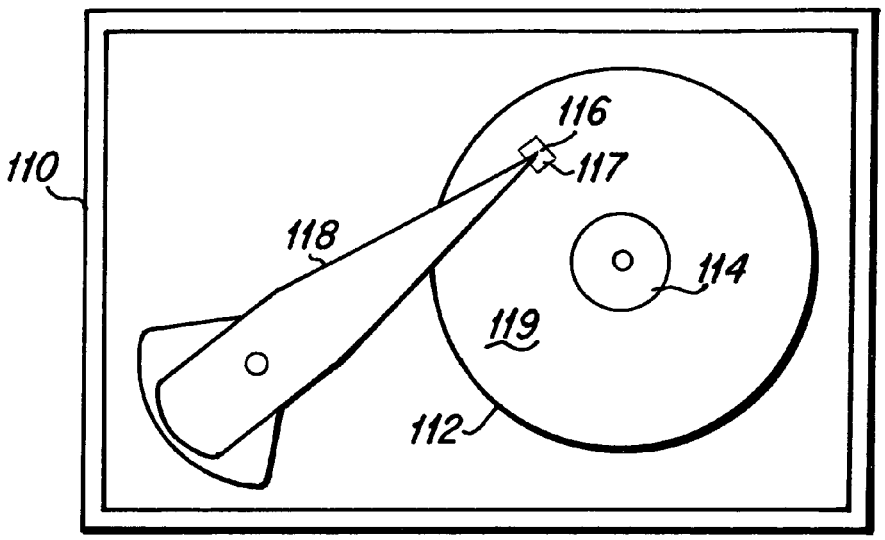
FIG. 3 is a schematic top plan view of a hard disk drive including a magnetic head of the present invention.
Figure 5A:
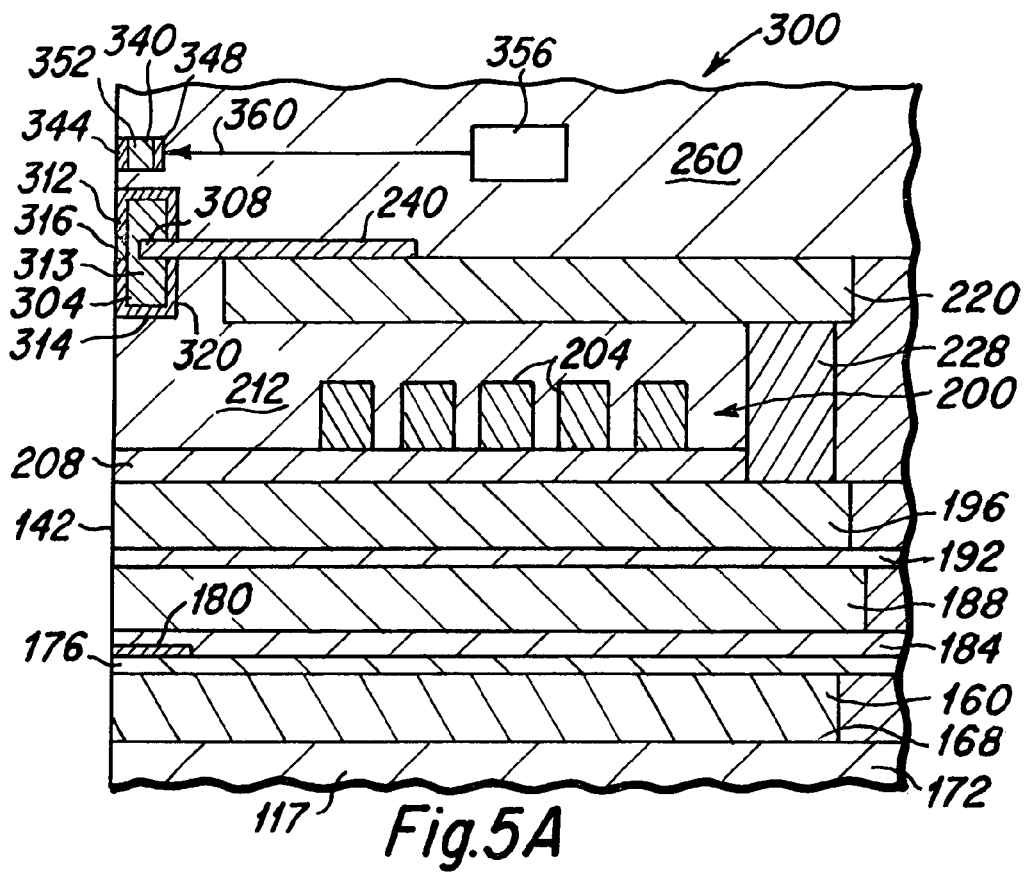
Figure 5B:
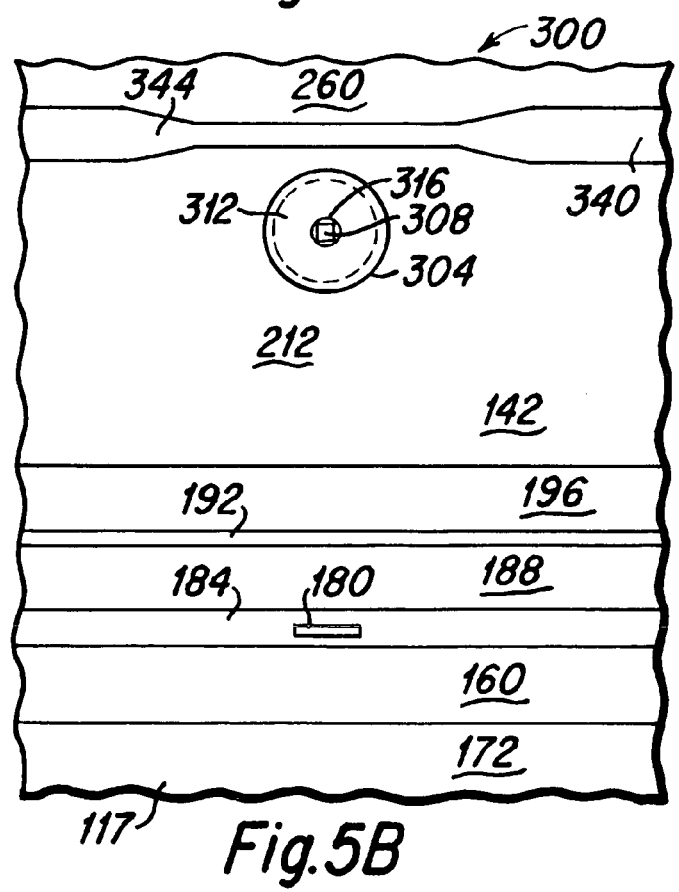
Figure 5C:
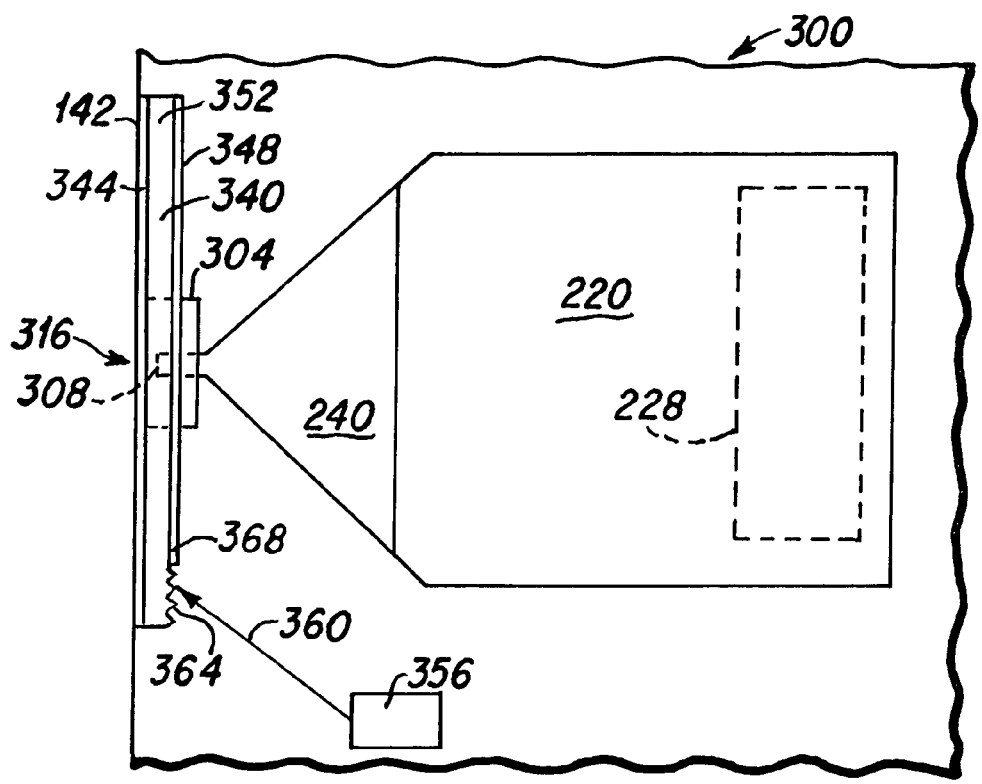

FIGS. 5A, 5B and 5C depict a first embodiment 300 of a magnetic head of the present invention that includes an optical resonant cavity media heating device 304, wherein FIG. 5A is a cross-sectional view, FIG. 5B is a plan view taken from the ABS, and FIG. 5C is a plan view from the downtrack side. Each of the embodiments 300, 400 and 500 of the present invention may serve as the magnetic head 116 within the hard disk drive 110 of the present invention, as described hereabove (FIG. 3). As depicted in FIGS. 5A, 5B and 5C, the magnetic head embodiment 300 includes a first magnetic shield layer 160, a read head sensor element 180 and a second magnetic shield layer 188, as well as the induction coil structure 200 within filling insulation 212, the shaping layer 220 and probe layer 240 that are similar to the structures depicted in FIG. 4 and described above, whereby they are correspondingly numbered for ease of comprehension.

A cylindrical cavity 304 is placed near the end of and coaxial with the pole tip 308. The pole tip end may be slightly recessed above the face 312 of the cylinder, and such an arrangement is best seen in FIG. 5A. At resonance in a fundamental mode at the input wavelength, the cavity 304 creates very high electric field and evanescent waves that emanate at the pole tip end and parallel to the pole axis. The cavity 304, consisting of a dielectric material 313 of high index of refraction (e.g., silicon for 1-2 μm wavelength), is in a matrix of another dielectric material 314 that has lower index of refraction (e.g., $SiO_2$), such that the fields are confined within the cavity. In the face 312 of the cavity 304 below the end of the write pole 308, a small aperture 316 is formed and filled with a material that has a different index of refraction than the dielectric material 314. The output energy, with electric fields mainly normal to the face 312 of the cavity, extends through this aperture 316 and down into the magnetic medium 150 to produce thermal heating. Although the size of the aperture 316 can affect the resonant behavior of the cavity, the cavity design can be pole-geometry specific. This means the aperture dimensions can be selected to produce resonance for given pole tip dimensions and required heated spot size. It is important to note that an increase in bit density of the hard disk drive 110 necessitates a change in pole dimensions to create the reduced size data bits and change in the dimensions of aperture 316. In this respect, it is possible to rescale the cavity dimensions without loss of effectiveness in heating, since the pole defines the location of maximum electric field and the location of the heated spot. Also, since the cavity is coaxial with the pole 308, the field remains in close proximity of the bit that is to be magnetically written.

For a fundamental mode with axial fields, the diameter of the cavity 304 is typically about 40% of the effective wavelength of the radiation, where the effective wavelength is defined as the ratio of the freespace wavelength to the index of refraction of the cavity material. For 1.55 μm waves in a silicon cavity, the cavity diameter is approximately 0.18 μm.

The dimensions for the pole tip 308 for 1 Tbit/in$^2$ would be of the order of 50 nm×75 nm. In this respect, the cavity post which is also the write pole tip 308 is 75 nm thick. Consequently, the ratio between the cavity diameter (0.18 μm) and the post diameter (75 nm) is 2.4. It is to be understood that these cavities can be designed for other wavelengths as is well known to those skilled in the art. Going to different wavelengths requires using compatible materials. As the wavelength and the materials change, the cavity dimensions will scale with the effective index.

In an effort to enhance resonance, it may be beneficial to coat the pole tip 308 with a thin film of nonferrous metal such as silver, gold, aluminum, rhodium, platinum, chromium, among others. Similarly, the two flat surfaces 312 and 320 of the cavity may also have similar nonferrous thin metal film.

In order to produce high efficiency coupling of light into the cavity 304, an optical waveguide 340, which may be tapering down 344 near the cavity, is placed in the vicinity of the cavity to provide the coupling. In FIG. 5B, a waveguide 340 is illustrated on the downtrack side of the write pole 308 and directed parallel to the ABS. Alternatively, the waveguide can be on the uptrack side of the cavity (not shown). The waveguide 340 is made of laminated thin film materials as illustrated in FIG. 5A and should be precisely spaced and integrated to the exterior of the cavity. The waveguide is preferably composed of three thin layers. The top and bottom layers 344 and 348 respectively are the "claddings" and can be either nonferrous metals or low index materials, and the center film 352 is the "core" which is a high index dielectric such as silicon. The waveguide needs to be in a matrix of dielectric material of low index of refraction, e.g., $SiO_2$.

Coupling the light source such as a solid state diode laser 356 to the waveguide 340 can be accomplished by one of several methods, where the source generally is an integrated component of the magnetic slider 117. One coupling method is best seen in FIG. 5C, in which a grating coupler 360 consisting of grating lines 364 are formed on the surface 368 of the waveguide opposite to side facing the ABS. The source 356 is appropriately focused and set at an angle of incidence for best coupling. Alternatively, light can be directly coupled into the end of the waveguide away from the cavity.

As is well understood by those skilled in the art, the initial process steps for fabricating a magnetic head are conducted upon the surface of a large wafer substrate. When all of the wafer stage process steps are completed, the wafer is sliced into a plurality of rows of magnetic heads, wherein the air bearing surface (ABS) of the magnetic heads in the row is exposed for further processing. In the prior art, the ABS processing steps generally include the polishing of the ABS surface down to a level at which the magnetic head components are desirably exposed at the ABS surface. In the present invention, the resonant cavity and waveguide are desirably fabricated during the row stage processing steps. Particularly, utilizing photolithographic techniques, an etching resist is deposited and patterned onto the ABS surface such that the resonant cavity and waveguide locations are exposed. Thereafter, utilizing a material removal process, such as an ion beam etching process or a reactive ion etch process, magnetic head material is removed from the ABS surface to create the resonant cavity and waveguide trenches. Thereafter, the trenches are filled, such as by ion beam or sputter deposition techniques with appropriate materials that comprise the dielectric material for the resonant cavity and waveguide. Thereafter, a capping surface material and an aperture are fabricated at the desired location for the resonant cavity.

It is therefore to be understood that the magnetic head of the present invention makes no significant changes in the fabrication of the read head portion and several other structures of the magnetic head.

Figure 6A:
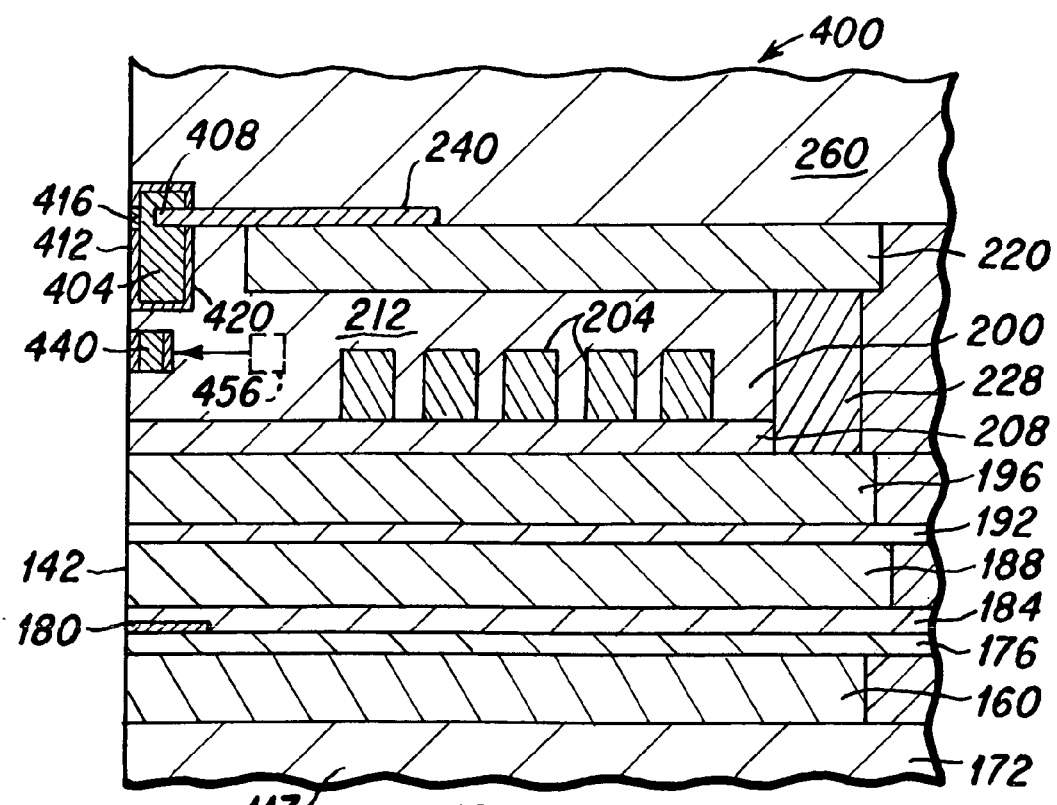
Figure 6B:
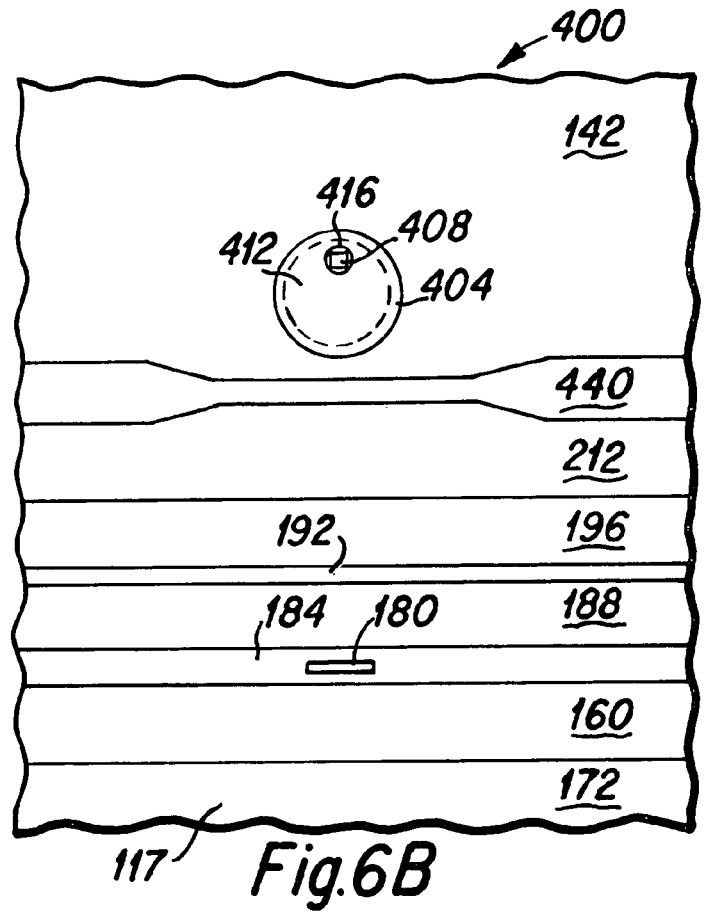
Figure 6C:
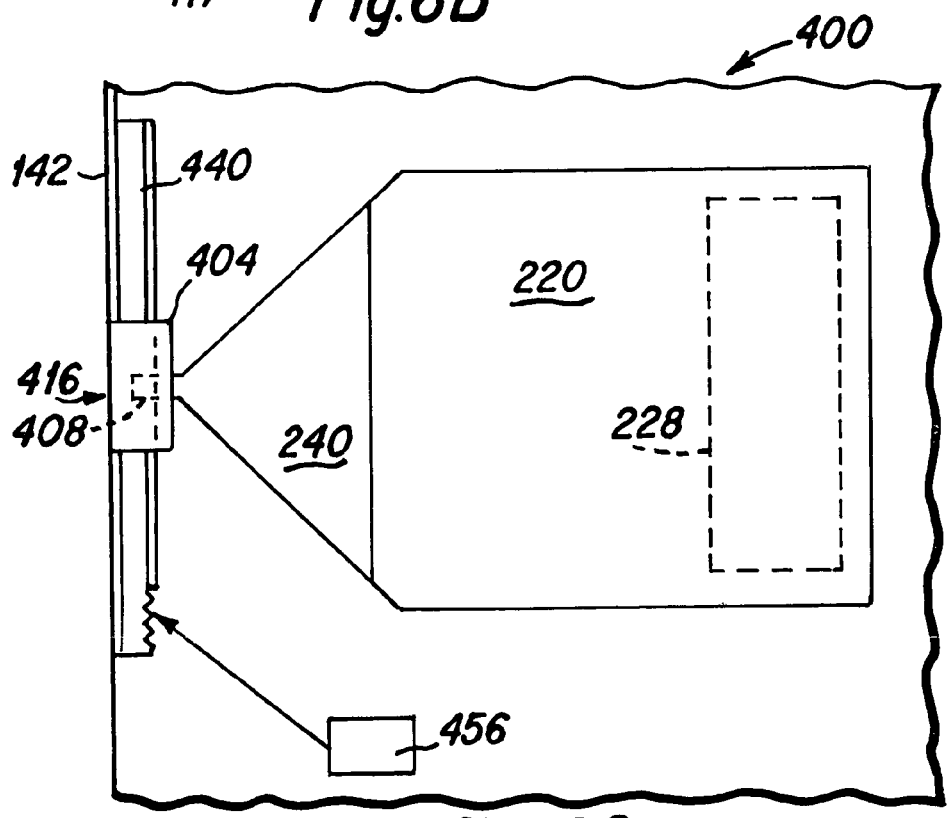

In a second embodiment 400 of a magnetic head of the present invention, a cylindrical WGM cavity is placed near the pole tip such that the pole tip and its end are wholly in the confines of the cavity. FIGS. 6A, 6B and 6C depict the second embodiment 400 that includes an optical resonant cavity media heating device, wherein FIG. 6A is a cross-sectional view, FIG. 6B is a plan view taken from the ABS, and FIG. 6C is a plan view from the downtrack side. As depicted therein, the magnetic head embodiment 400 includes a first magnetic shield layer 160, a read head sensor element 180 and a second magnetic shield layer 184, as well as the first magnetic pole 196, induction coil structure 200 within filling insulation 212, the shaping layer 220 and probe layer 240 that are similar to the structures depicted in FIG. 4 and described above, whereby they are correspondingly numbered for ease of comprehension.

As is depicted in FIGS. 6A, 6B and 6C, the central axis of the cylindrical cavity 404 is parallel to but offset from the axis of the write pole 408 as is best seen in FIG. 6B. In this respect the bulk of the body of the cavity lies in the uptrack space between the write 408 and return 196 poles. Alternatively, the bulk of the cavity body can be oriented in the downtrack direction from the write pole or to the side of the write pole (such orientations are not shown herein). The exact location of the write pole tip 408 within the cavity is carefully selected such that it is at the same radial location as an antinode of a resonant mode, at the input wavelength. The end of the pole tip may be slightly retracted from the face 412 of the cavity. A WGM mode resonance at the input wavelength can provide very high electric fields normal to the plane of the aperture 416 opposite to the pole tip 408 as is discussed above. The output energy, with electric fields mainly normal to the face 412 of the cavity, can extend to and penetrate into the magnetic medium 150 to produce thermal heating. Although the size of the aperture 416 can affect the resonant behavior of the cavity, the cavity design can be pole-geometry and pole dimensions specific. This means the aperture dimensions can be designed to produce resonance for given pole tip dimensions and required heated spot size. It is important to note that an increase in bit density necessitates an increase in pole and aperture dimensions. In this respect, it is possible to rescale the cavity dimensions without loss of effectiveness in heating since the pole defines the location of maximum electric field and the location of the heated spot. For the Si cavities and 1.55 μm wavelength case as discussed earlier, a 2 um diameter cavity would support approximately 20 maxima in a WGM mode with an axial electric field around the periphery. As before, the pole tip is about 50 nm×75 nm, which is easily compatible with the diameter of the cavity.

In an effort to enhance resonance, it may be beneficial to coat the pole tip 408 with a thin film of nonferrous metal such as silver, gold, aluminum, rhodium, platinum, chromium, among others. Similarly, the two flat surfaces 412 and 420 respectively of the cavity may also have similar thin metal film.

In order to provide high efficiency coupling of light into the cavity 404, the optical waveguide 440 is placed in the vicinity of the cavity to provide the coupling. As is best seen in FIG. 6B, a waveguide 440 is illustrated on the uptrack side of the write pole 408. The construction of the waveguide and its coupling to the diode laser source 456 are similar to that depicted in FIGS. 5A, 5B and 5C described above. If the bulk of the body of the cavity 404 is on the down track side then the waveguide 440 needs to be on the down track side of the cavity (away from the pole tip 408). The coupling of the light source 456 such as a solid state diode laser to the waveguide 440 is similar to that depicted in FIGS. 5A, 5B and 5C and described above.

In a third embodiment 500 of the present invention a cylindrical WGM cavity 504 can be placed near the pole tip 508 such that the pole tip is on the down track side of the cavity. FIGS. 7A, 7B and 7C depict this third embodiment 500 of a magnetic head of the present invention that includes an optical energy resonant cavity media heating device, wherein FIG. 7A is a cross-sectional view, FIG. 7B is a plan view taken from the ABS, and FIG. 7C is a plan view from the downtrack side. As depicted therein, the magnetic head embodiment 500 includes a first magnetic shield layer 160, a read head sensor element 180 and a second magnetic shield layer 184, as well as the induction coil structure 200 within filling insulation 212, the shaping layer 220 and probe layer 240 that are similar to the structures depicted in FIG. 4 and described above, whereby they are correspondingly numbered for ease of comprehension.

The WGM cavity 504 is preferably fabricated with a post 506 that is parallel to the axis of the write pole 508 to make it a reentrant cavity, and FIGS. 7A, 7B and 7C illustrate a cavity placed in a way such that its body is uptrack of the write pole 508, where a post 506 is shown inside the cavity 504 close to the write pole. In the case that there is no post 506 inside the cavity 504, a dielectric aperture as described above must be placed at the location of an antinode or intensity maximum that is the closest to the write pole 508. Alternatively, if there is a post 506 inside the cavity as depicted in FIGS. 7A, B and C, the short gap created between the post 506 and the face 512 of the cavity defines the location of an antinode. This post 506 can be placed at the appropriate radial location in the cavity and close to the write pole 508. Preferably the post 506 should be less than a few tens of nanometers on the uptrack side of the write pole 508 such that a heated media area will be in the write field in about 1 nsec. The benefit of having a dedicated post 506 is that the dimensions of the post and aperture 516 can be selected for the best resonance performance and the best size of the heated spot. It is important to note that an increase in bit density necessitates a change in pole dimensions. In this respect, the resealing of the cavity dimensions for higher bit density should not displace the heated spot undesirably far from the written bit.

As in the second embodiment 400 described above, a WGM mode that resonates at the input wavelength can provide very high electric fields normal to the plane of the aperture 516 opposite to the post 506. The output energy, with electric fields mainly normal to the face 512 of the cavity, can extend to and penetrate into the magnetic medium 150 to produce thermal heating. Although the size of the aperture 512 can affect the resonant behavior of the cavity, the cavity design can be pole-geometry and aperture dimensions specific. This means the aperture dimensions can be designed to produce resonance for a given pole tip and required heated spot size. For the Si cavities and 1.55 μm wavelength case as discussed above, a 2 μm diameter WGM cavity would support approximately 20 maxima around the periphery. As above, the pole tip is about 50 nm×75 nm, which is easily compatible with the diameter of the cavity. The post 506 can be made of a nonferrous metal such as silver, gold, aluminum, rhodium, platinum, chromium, among others. Similarly, the two flat surfaces 512 and 520 of the cavity may also have similar thin metal film.

In order to provide high efficiency coupling of light into the cavity 504, an optical waveguide 540 is placed in the vicinity of the cavity 504 to provide the coupling. In FIG. 7B, a waveguide 540 is illustrated on the up track side of the cavity 504. The construction of the waveguide 540 and its coupling to the diode laser source 556 is similar to that depicted in FIGS. 6A, 6B and 6C and described above.

In a fourth embodiment 600 of the present invention a cylindrical WGM cavity 604 can be placed near the pole tip 608 such that the pole tip is on the down track side of the cavity. FIGS. 8A, 8B and 8C depict this fourth embodiment 600 of a magnetic head of the present invention that includes an optical energy resonant cavity media heating device and a near field aperture 630, wherein FIG. 8A is a cross-sectional view, FIG. 8B is a plan view taken from the ABS, and FIG. 8C is a plan view from the downtrack side. As depicted therein, the magnetic head embodiment 600 includes a first magnetic shield layer 160, a read head sensor element 180 and a second magnetic shield layer 184, as well as the induction coil structure 200 within filling insulation 212, the shaping layer 220 and probe layer 240 that are similar to the structures depicted in FIG. 4 and described above, whereby they are correspondingly numbered for ease of comprehension.

The WGM cavity 604 is fabricated either with a post 606 or without a post. If a post 606 is fabricated, it is preferred that its axis is parallel to the axis of the write pole 608 to make it a reentrant cavity, and FIGS. 8A, 8B and 8C illustrate a cavity placed in a way such that its body is uptrack of the write pole 608, where a post 606 is shown inside the cavity 604 close to the write pole. In the case that there is no post 606 inside the cavity 604, a dielectric aperture 616 as described above must be placed at the location of an antinode or intensity maximum that is the closest to the write pole 608. Alternatively, if there is a post 606 inside the cavity as depicted in FIGS. 8A, 8B and 8C, the short gap created between the post 606 and the face 612 of the cavity defines the location of an antinode. This post 606 can be placed at the appropriate radial location in the cavity and close to the write pole 608. Preferably the post 606 should be less than a few tens of nanometers on the uptrack side of the write pole 608 such that a heated media area will be in the write field in about 1 nsec. The benefit of having a dedicated post 606 is that the dimensions of the post and aperture 616 can be selected for the best resonance performance.

Adjacent to the aperture 616 of the cavity is a near field aperture 630 which is in the plane of the ABS and consists of an opening 634 in a nonferrous metal film 632 comprised of a material, such as silver, gold, aluminum, rhodium, platinum, chromium and others, the film being a fraction of a wavelength thick. In the case of the near field aperture 630 belonging to a type of waveguide called ridged waveguide, the shape of the opening 634 of the near field aperture 630 can resemble the character C (described by X. Shi and L. Hesselink in Journal of the Optical Society of America B Vol. 21, No. 7, 1305-1317, "Design of a C aperture to achieve $\lambda/10$ resolution and resonant transmission") or the character H. Other opening geometries which can deliver a near field optical energy spot of enhanced intensity and subwavelength dimensions can also be used. The axis of the opening 634 of the near field aperture 630 is preferably coaxial with the aperture 616 of cavity 604. The spacing of the face 612 of the cavity containing the aperture 616 is preferably a few tens of nanometers from the input face 636 of the near field aperture 630. FIG. 8A depicts the case where there is post 606 inside cavity 604, which is proximate the near field aperture 630. The case when post 606 is not present is not shown, but will be well understood by those skilled in the art upon reviewing this disclosure. The spacing of the output face 638 of the near field aperture should be at or a few nanometers from the air bearing surface 142. The near field aperture 630 is preferably made of a metal film 632 of a typical thickness of several tens of nanometers. The opening 634 can be a ridged waveguide of a shape resembling the letter C or H or appropriate shape effective for delivering a near field optical energy spot of enhanced intensity and subwavelength dimensions. In FIG. 8B the opening 634 in the near field aperture 630 is depicted to resemble the letter C. The orientation of the opening 634 in the near field aperture should also be selected to bring the heating spot close to the write pole 608.

As in the second embodiment 400 described above, a WGM mode that resonates at the input wavelength can provide very high electric fields normal to the plane of the aperture 616 opposite to the post 606. The output energy, with electric fields mainly normal to the face 612 of the cavity, can extend to and penetrate into the near field aperture 630 to produce enhanced transmission and therefore thermal heating at the magnetic medium. The size of the aperture 616 is selected to optimize coupling of this beam to the size of the near field aperture 630. Since the size of the aperture 616 can affect the resonant behavior of the cavity 604, the cavity design can be adjusted for best performance of the coupled cavity-near field aperture operation. This means the aperture 616 dimensions for the cavity 604 can be designed to produce resonance for a given pole tip and required heated spot size for the near field aperture 630. For the Si cavities and 1.55 µm wavelength case as discussed above, a 2 µm diameter WGM cavity would support approximately 20 maxima around the periphery. As above, the pole tip dimensions can be adjusted for best performance with the near field aperture 630. The post 606 can be made of a nonferrous metal such as silver, gold, aluminum, rhodium, platinum, chromium, among others. Similarly, the two flat surfaces 612 and 620 of the cavity may also have similar thin metal film.

In order to provide high efficiency coupling of light into the cavity 604, an optical waveguide 640 is placed in the vicinity of the cavity 604 to provide the coupling. In FIG. 8B, a waveguide 640 is illustrated on the up track side of the cavity 604. The construction of the waveguide 640 and its coupling to the diode laser source 656 is similar to that depicted in FIGS. 6A, 6B and 6C and described above.

It should be noted that a circular cylindrical cavity with a coaxial post and aperture along its axis as depicted in FIGS. 5A, 5B and 5C, but where the post is not a write pole, can also be used for coupling light to a near field aperture, as is shown for the case of a cylindrical cavity with a non-coaxial post in FIGS. 8A, 8B and 8C. For thermally assisted recording, however, because the post and the aperture are at the center of the cavity, the magnetic pole will be at least at a distance of one cavity radius away. As discussed before as an example for 1.55 µm wavelength in a silicon reentrant cavity, the cavity diameter is approximately 0.18 µm. This infers that the write pole necessarily has to be at least 90 nm from the cavity. When the heating spot is 90 nm uptrack of the write pole, the time it takes for the heated spot to reach the write pole can be a few nanoseconds which can be excessively long for the hot spot in the magnetic medium to remain heated.

In summary, this invention describes a mechanism for producing large electric fields in small localized areas (on the order of 20-30 nm across) on a recording medium. The invention describes how light can be efficiently conveyed from a source to the medium. It also describes how such a structure can be built and integrated with a magnetic recording head. The present invention also includes the use of a square, rectangular or polygonal cavity instead of a conventional circular one. A cavity with a straight boundary can provide better tunneling/coupling paths than one with a curved boundary, and comparable results will be obtained with such cavities.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A magnetic head, comprising:
   a write head portion having an air bearing surface thereof;
   an optical resonant cavity being disposed entirely within said magnetic head and proximate said air bearing surface;
   an optical energy source and an optical energy transmission means to couple optical energy from the source to said resonant cavity;
   said resonant cavity including an aperture for directing optical energy from said resonant cavity generally perpendicularly to said air bearing surface.

2. A magnetic head as described in claim 1 wherein said optical energy transmission means includes a waveguide that is disposed apart from and proximate to said resonant cavity.

3. A magnetic head as described in claim 2 wherein said waveguide includes a tapered portion and a narrowed waveguide portion that is disposed proximate said resonant cavity.

4. A magnetic head as described in claim 1 wherein said resonant cavity includes a post that is disposed within said resonant cavity.

5. A magnetic head as described in claim 4 wherein said post includes an end portion that is disposed proximate said aperture.

6. A magnetic head as described in claim 4 wherein said post comprises a write pole of said write head portion of the magnetic head.

7. A magnetic head as described in claim 6 wherein said post has a coating comprised of a nonferrous metal such as silver, gold, aluminum, rhodium, platinum and chromium.

8. A magnetic head as described in claim 4 wherein said post is disposed at a resonant antinode of optical energy within said resonant cavity.

9. A magnetic head as described in claim 4 wherein said post is disposed at a location that is uptrack from said write pole of said write head portion of the magnetic head.

10. A magnetic head as described in claim 1 wherein said resonant cavity is sized for resonance within said cavity at a laser wavelength.

11. A magnetic head as described in claim 1 wherein said aperture has an index of refraction that differs from an index of refraction of the cavity material.

12. A magnetic head as described in claim 1 wherein said resonant cavity is circular cylindrical, having a central axis that is perpendicular to said air bearing surface.

13. A magnetic head as described in claim 12 wherein said resonant cavity includes a post that is disposed along said central axis of said resonant cavity.

14. A magnetic head as described in claim 13 wherein said post is comprised of a nonferrous metal such as silver, gold, aluminum, rhodium, platinum and chromium.

15. A magnetic head as described in claim 1 wherein said aperture is disposed at a location that is uptrack from said write pole of said write head portion of the magnetic head.

16. A magnetic head as described in claim 1 wherein said aperture is formed with a subwavelength dimension compared to the wavelength of optical energy within said resonant cavity.

17. A magnetic head as described in claim 1 wherein said resonant cavity is comprised of a material of relatively higher index of refraction than proximate exterior material and said aperture is comprised of material of index of refraction different from that of the cavity material.

18. A magnetic head as described in claim 1 wherein said resonant cavity is sized for WGM resonance within said cavity at a laser wavelength.

19. A magnetic head as described in claim 1 wherein said resonant cavity is sized for WGM resonance and includes a post disposed at an antinode and parallel to a central axis of said cavity and said post is comprised of a nonferrous metal such as silver, gold, aluminum, rhodium, platinum and chromium.

20. A magnetic head as described in claim 1 wherein dimensions and geometry of said aperture are selected to provide a heating spot having dimensions on the magnetic disk medium that is approximately the same size as data bits formed on said disk medium.

21. A magnetic head as described in claim 1 wherein said write head portion of the magnetic head includes a write pole tip, and said aperture is approximately the same size as said write pole tip.

22. A magnetic head as described in claim 1 wherein said write head portion further includes a near field aperture disposed between said resonant cavity and said air bearing surface.

23. A magnetic head as described in claim 22 wherein said near field aperture includes an opening that is axially aligned with said aperture of said resonant cavity.

24. A magnetic head as described in claim 23 wherein said near field aperture is formed as a thin film comprised of a nonferrous metal.

25. A magnetic head as described in claim 24 wherein said near field aperture is comprised of a metal such as silver, gold, aluminum, rhodium, platinum and chromium.

26. A magnetic head as described in claim 23 wherein said opening is formed in a C or H shape.

27. A magnetic head as described in claim 23 wherein said near field aperture functions as a ridged waveguide.

28. A magnetic head as described in claim 23 wherein said resonant cavity further includes a post that is disposed coaxially with said opening in said near field aperture.

29. A magnetic head as described in claim 1 wherein said optical energy source is disposed within the magnetic head.

30. A hard disk drive, comprising:
   at least one hard disk being fabricated for rotary motion upon a disk drive;
   at least one magnetic head adapted to fly over said hard disk for writing data on said hard disk, said magnetic head including:
   a write head portion having an air bearing surface thereof;

an optical resonant cavity being disposed entirely within said magnetic head and proximate said air bearing surface;

an optical energy source and an optical energy transmission means to couple optical energy from the source to said resonant cavity;

said resonant cavity including an aperture for directing optical energy from said resonant cavity generally perpendicularly to said air bearing surface.

31. A hard disk drive as described in claim 30 wherein said optical energy transmission means includes a waveguide that is disposed apart from and proximate to said resonant cavity.

32. A hard disk drive as described in claim 31 wherein said waveguide includes a tapered portion and a narrowed waveguide portion that is disposed proximate said resonant cavity.

33. A hard disk drive as described in claim 30 wherein said resonant cavity includes a post that is disposed within said resonant cavity.

34. A hard disk drive as described in claim 33 wherein said post comprises a write pole of said write head portion of the magnetic head.

35. A hard disk drive as described in claim 33 wherein said post is disposed at a location that is uptrack from said write pole of said write head portion of the magnetic head.

36. A hard disk drive as described in claim 30 wherein said resonant cavity is circular cylindrical, having a central axis that is perpendicular to said air bearing surface.

37. A hard disk drive as described in claim 30 wherein said aperture is disposed at a location that is uptrack from said write pole of said write head portion of the magnetic head.

38. A hard disk drive as described in claim 30 wherein said write head portion further includes a near field aperture disposed between said resonant cavity and said air bearing surface.

39. A hard disk drive as described in claim 38 wherein said near field aperture includes an opening that is axially aligned with said aperture of said resonant cavity.

40. A hard disk drive as described in claim 38 wherein said near field aperture is formed as a thin film comprised of a nonferrous metal.

41. A hard disk drive as described in claim 38 wherein said near field aperture is comprised of a metal such as silver, gold, aluminum, rhodium, platinum and chromium.

42. A hard disk drive as described in claim 38 wherein said opening is formed in a C or H shape.

43. A hard disk drive as described in claim 38 wherein said near field aperture functions as a ridged waveguide.

44. A hard disk drive as described in claim 38 wherein said resonant cavity further includes a post that is disposed coaxially with said opening in said near field aperture.

45. A hard disk drive as described in claim 30 wherein said optical energy source is disposed within the magnetic head.

* * * * *